(12) United States Patent
Sunagawa et al.

(10) Patent No.: US 6,746,800 B1
(45) Date of Patent: Jun. 8, 2004

(54) NONAQUEOUS ELECTROLYTE SECONDARY BATTERY

(75) Inventors: Takuya Sunagawa, Moriguchi (JP); Hiroyuki Fujimoto, Moriguchi (JP); Ryuji Ohshita, Moriguchi (JP); Shin Fujitani, Moriguchi (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/914,653

(22) PCT Filed: Feb. 9, 2000

(86) PCT No.: PCT/JP00/00731

§ 371 (c)(1),
(2), (4) Date: Aug. 31, 2001

(87) PCT Pub. No.: WO00/52773

PCT Pub. Date: Sep. 8, 2000

(30) Foreign Application Priority Data

Mar. 1, 1999 (JP) ............................................. 11/052741
Dec. 17, 1999 (JP) ........................................... 11/358615

(51) Int. Cl.$^7$ ................................................. H01L 4/58
(52) U.S. Cl. ............................... 429/231.1; 429/231.3; 429/231.6; 429/231.5; 429/224; 429/223; 429/221; 429/218.1
(58) Field of Search .............................. 429/231.1, 224, 429/223, 218.1, 231.3, 221, 231.6, 231.5

(56) References Cited

U.S. PATENT DOCUMENTS 5,783,333 A * 7/1998 Mayer ........................ 429/223
6,007,947 A * 12/1999 Mayer ..................... 429/231.1

FOREIGN PATENT DOCUMENTS

| HU | 215866 | 3/1999 |
|----|--------|--------|
| JP | 7-307164 | 11/1995 |
| JP | 8-45498 | 2/1996 |
| JP | 11-3698 | 1/1999 |
| JP | 11-54122 | 2/1999 |

OTHER PUBLICATIONS

"The Spinel Phases LiM$_y$Mn$_{2-y}$O$_4$ (M=Co, Cr, Ni) as the Cathode for Rechargeable Lithium Batteries", Li Gouhua et al.; J. Electrochem. Soc., vol. 143, No. 1, p. 178–182, (Jan., 1996).

M.M. Thackeray et al.; "Structural Stability of LiMn$_2$O$_4$ electrodes for lithium batteries" Journal of Power Sources, 1997, vol. 68, No. 1, pp. 153 to 158.

* cited by examiner

*Primary Examiner*—Laura Weiner
(74) *Attorney, Agent, or Firm*—W. F. Fasse; W. G. Fasse

(57) ABSTRACT

A nonaqueous electrolyte secondary battery characterized as using a mixture of a first oxide and a second oxide for its positive electrode material. The first oxide is a spinel oxide consisting substantially of lithium, manganese, a metal other than manganese, and oxygen. The second oxide is different in composition from the first oxide and consists substantially of lithium, nickel, cobalt, a metal other than nickel and cobalt, and oxygen.

22 Claims, 4 Drawing Sheets

NONAQUEOUS ELECTROLYTE SECONDARY BATTERY

TECHNICAL FIELD

The present invention relates to nonaqueous electrolyte secondary batteries as generally represented by lithium secondary batteries, and particularly to load characteristic improvements of positive electrode material after cycling.

BACKGROUND ART

In recent years, nonaqueous electrolyte batteries which use metallic lithium, alloys capable of storage and release of lithium ions or carbon materials for the negative active material and lithium-transition metal complex oxides for the positive electrode material have been noted as high-density batteries.

The use of a lithium-cobalt complex oxide ($LiCoO_2$), lithium-nickel complex oxide ($LiNiO_2$) or lithium-manganese complex oxide ($LiMn_2O_4$), among the lithium-transition metal complex oxides, for the positive active material results in obtaining high discharge voltages of 4 V class, particularly increasing battery energy densities.

Among the above-listed complex oxides useful for the positive active material, a spinel lithium-manganese complex oxide ($LiMn_2O_4$) is regarded as promising from viewpoints of price and stable supply of raw material.

However, there still remains a room for improvement in the use of such a lithium-manganese complex oxide ($LiMn_2O_4$) for the positive electrode material. Specifically, this spinel complex oxide shows a marked reduction in capacity with charge-discharge cycling, compared to lithium-cobalt and lithium-nickel complex oxides which do not have a spinel structure.

As one solution to this problem, M. Wakihara et al. reports that the reinforcement of a crystal structure by substitution of a dissimilar element, such as Co, Cr or Ni, for a part of Mn atoms in the spinel lithium-manganese complex oxide ($LiMn_2O_4$) improves cycle characteristics (see J.Electrochem.Soc., Vol.143, No.1, p.178 (1996)).

However, such substitution has been still insufficient to improve cycle characteristics because of the following reason. As the spinel lithium-manganese complex oxide undergoes expansion and shrinkage during every charge-discharge cycle of a secondary battery, active material particles also undergo expansion and shrinkage. This reduces a strength of the positive electrode and causes insufficient contact of the active material particles with current collector particles, resulting either in the reduced utilization of the positive electrode or in the fall-off of a cathode mix from a current collector, which both have been problems.

Japanese Patent Laying-Open No. Hei 8-45498 proposes a technique for limiting expansion and shrinkage of a cathode mix in its entirety by combining a lithium-manganese complex oxide with a lithium-nickel complex oxide, based on the finding that the lithium-manganese complex oxide undergoes crystal expansion while the lithium-nickel complex oxide undergoes crystal shrinkage when lithium ions are inserted thereinto.

Also, Japanese Patent Laying-Open Nos. Hei 11-3698 and Hei 1-54122 propose a technique for improving electronic conduction of a cathode mix as a whole and thus cycle performance characteristics by combining a lithium-nickel complex oxide, a lithium-cobalt complex oxide and a lithium-manganese complex oxide, based on the finding that the lithium-cobalt complex oxide exhibits a higher electronic conduction than the lithium-manganese complex oxide.

While such combinations achieve improvements to certain degrees, there still remains a room for improving cycle performance characteristics. The inventors of the present application have studied the reduction in capacity with cycling for a positive electrode material (active material) containing a mixture of a spinel lithium-manganese complex oxide and a lithium-nickel complex oxide and found that its load characteristics decrease with increasing cycles. That is, the capacity reduction has been observed to occur when its capacities both initially and after cycles are measured at a relatively high current, e.g., at a 1 C discharge rate, as a result of the reduced load characteristics.

DISCLOSURE OF THE INVENTION

It is an object of the present invention to provide a nonaqueous electrolyte secondary battery which has a high capacity retention and exhibits improved cycle performance characteristics.

A nonaqueous electrolyte secondary battery in accordance with a first aspect of the present invention is characterized as using a mixture of a first oxide and a second oxide for the positive electrode material. The first oxide is a spinel oxide consisting substantially of lithium, manganese, a metal other than manganese, and oxygen. The second oxide is different in composition from the first oxide and consists substantially of lithium, nickel, cobalt, a metal other than nickel and cobalt, and oxygen.

The first aspect of the present invention is described below.

A specific example of the first oxide is an oxide derived via substitution of other element for a part of manganese in a lithium-manganese complex oxide. A specific example of the second oxide is an oxide derived via substitution of cobalt and other element for a part of nickel in a lithium-nickel complex oxide.

The use, in combination, of the first oxide derived via substitution of other element for a part of manganese in the spinel lithium-manganese complex oxide and the second oxide derived via substitution of cobalt and other element for a part of nickel in the lithium-nickel complex oxide is effective to suppress deterioration of load characteristics with cycling. A first reason for this is considered due to the inclusion of dissimilar elements, in theform of a solid solution, that causes active material comprising the first and second oxides to undergo a change in electronic state to the extent that improves electronic conduction of the active material in its entirety. A second reason is considered due to the use, in combination, of the lithium-manganese complex oxide which undergoes crystal expansion when lithium ions are inserted thereinto and the lithium-nickel-cobalt complex oxide which undergoes crystal shrinkage when lithium ions are inserted thereinto, that is effective to maintain stable contact between particles of the first and second oxides during repetitive cycling.

Examples of first oxides include spinel lithium-manganese complex oxides represented by the compositional formula $Li_xMn_{2-y}M1_yO_{4+z}$ (where M1 is at least one element selected from the group consisting of Al, Co, Ni, Mg and Fe, $0 \leq x \leq 1.2$, $0 < y \leq 0.1$ and $-0.2 \leq z \leq 0.2$).

Preferably, M1 in the compositional formula $Li_xMn_{2-y}M1_yO_{4+z}$ is at least one of Al and Mg.

Examples of second oxides include complex oxides represented by the compositional formula $Li_aM2_bNi_cCo_dO_2$ (where M2 is at least one element selected from the group consisting of Al, Mn, Mg and Ti, $0<a<1.3$, $0.02 \leq b \leq 0.3$, $0.02 \leq d/(c+d) \leq 0.9$ and $b+c+d=1$). Preferred among them are those which contain Al in the place of M2 and satisfy $0.1 \leq d/(c+d) \leq 0.5$ in the compositional formula $Li_aM2_bNi_cCo_dO_2$.

The capacity is suitably maintained at high values, if the aforementioned first and second oxides are mixed in the ratio by weight of 20:80–80:20. Within the specified range, the electronic conductivity of the whole is improved and contact between particles of first and second oxides is maintained in a more stable manner, so that deterioration of load characteristics with cycling is suppressed effectively.

The first oxide in the form of a lithium-manganese complex oxide preferably has a mean particle diameter of 5–30 µm. The second oxide in the form of a lithium-nickel-cobalt complex oxide preferably has a mean particle diameter of 3–15 µm. The combination thereof is most preferred. Preferably, the first oxide has a larger mean particle diameter than the second oxide. If the mean particle diameter of each oxide is maintained within the above-specified range, contact between particles of those complex oxides is maintained at a higher degree of occurrence to thereby improve the electronic conduction of the mix in its entirety. Also, expansion and shrinkage are balanced more effectively between those complex oxides so that contact between particles of those complex oxides is maintained in a more stable manner. As a result, the deterioration of load characteristics with cycling can be suppressed. The mean particle diameter is determined by observing the positive active material or cathode mix with a scanning electron microscope (SEM), measuring londitudinal dimensions, of 5 particles among active material particles present in a 100 µm square and calculating a mean value which is taken as a mean dimension for all particles.

If the above-described configurations and constructions are satisfied properly, nonaqueous electrolyte secondary batteries can be provided which are highly reliable and show little deterioration of load characteristics with charge-discharge cycling.

A nonaqueous electrolyte secondary battery in accordance with a second aspect of the present invention is characterized as using a mixture of a first oxide, second oxide and third oxide for the positive electrode material. The first oxide is a spinel oxide consisting substantially of lithium, manganese, a metal other than manganese, and oxygen. The second oxide is diffent in composition from the first oxide and consists substantially of lithium, nickel, cobalt, a metal other than nickel and cobalt, and oxygen. The third oxide is diffent in composition from the first and second oxides and consists substantially of lithium, cobalt, a metal other than cobalt, and oxygen.

The second aspect of the present invention is described below.

The first and second oxides used in the first aspect of the present invention are applicable to this second aspect.

Specific examples of third oxides include lithium-cobalt complex oxides and oxides derived via substitution of other element for a part of cobalt in lithium-cobalt complex oxides.

Also in the second aspect, the use of the same first and second oxides used in the first aspect suppresses the deterioration of load characteristics with cycling for the same reasons adduced in the first aspect.

In the second invention, the third oxide is further mixed with the first and second oxides. The increased electronic conductivity of the third oxide relative to the first and second oxides is effective to further suppress deterioration of load characteristics with cycling (See, for example, M. Menetrier et al., "The Second Japan-France Joint Seminar on Lithium Batteries, Nov. 23–24, 1998, Morioka, Japan", p.83).

Examples of third oxides include complex oxides represented by the compositional formula $Li_eM3_fCo_{1-f}O_2$ (where, M3 is at least one element selected from the group consisting of Al, Mn, Mg and Ti, $0<e<1.3$ and $0 \leq f<0.4$). Preferred among them are those which contain at least one of Mg and Ti in the place of M3 and satisfy $0.02 \leq f \leq 0.2$ in the compositional formula $Li_eM3_fCo_{1-f}O_2$.

The capacity is suitably maintained at high values when the aforementioned first, second and third oxides are mixed in the weight ratio of (first oxide):(second oxide+third oxide)=20:80–80:20. Within the specified range, the electronic conductivity of the whole is improved and contact between particles of the first, second and third oxides is maintained in a more stable manner, so that deterioration of load characteristics with cycling can be suppressed.

The capacity is optimally maintained at high values when the aforementioned second and third oxides are mixed in the weight ratio of (second oxide):(third oxide)=90:10–10:90. Within the specified range, electronic conductivity of the whole is further improved and deterioration of load characteristics with cycling is further suppressed.

The first oxide in the form of a lithium-manganese complex oxide preferably has a mean particle diameter of 5–30 µm. The second oxide in the form of a lithium-nickel-cobalt complex oxide preferably has a mean particle diameter of 3–15 µm. The third oxide in the form of a lithium-cobalt complex oxide preferably has a mean particle diameter of 3–15 µm. The combination thereof is most preferred. Preferably, the first oxide has a larger mean particle diameter than the second and third oxides. If the mean particle diameter of each oxide is maintained within the above-specified range, contact between particles of those complex oxides is maintained at a higher degree of occurrence to thereby improve the electronic conductivity of the mix in its entirety. Also, expansion and shrinkage are balanced more effectively between those complex oxides so that contact between particles of those complex oxides is maintained in a more stable manner. As a result, the load characteristic deterioration with cycling can be suppressed. The mean particle diameter can be determined in the same manner as described in the first aspect.

If the above-described configurations and constructions are satisfied properly, nonaqueous electrolyte secondary batteries can be provided which are highly reliable and show little deterioration of load characteristics with charge-discharge cycling.

The matters in common with the first and second aspects of the present invention are below described as "present invention", collectively.

The battery materials other than the positive electrode material, for use in the present invention, can be selected from those known in the prior art as useful for nonaqueous electrolyte secondary batteries, without particular limitations.

Examples of negative electrode materials include lithium alloys such as metallic lithium, lithium-aluminum alloys capable of storage and release of lithium, lithium-lead alloys and lithium-tin alloys; carbon materials such as graphite, coke and calcined organics; and metal oxides having potentials more negative than the positive active material, such as $SnO_2$, $SnO$, $TiO_2$ and $Nb_2O_3$.

Examples of nonaqueous electrolyte solvents include high-boiling solvents such as ethylene carbonate (EC), propylene carbonate (PC), vinylene carbonate (VC) and butylene carbonate (BC); and mixed solvents thereof in combination with low-boiling solvents such as dimethyl carbonate (DMC), diethyl carbonate (DEC), methyl ethyl carbonate (EMC), 1,2-diethoxyethane (DEE), 1,2-dimethoxy ethane (DME) and ethoxymethoxyethane (EME).

BEST MODES FOR CARRYING OUT THE INVENTION

Figure 1:
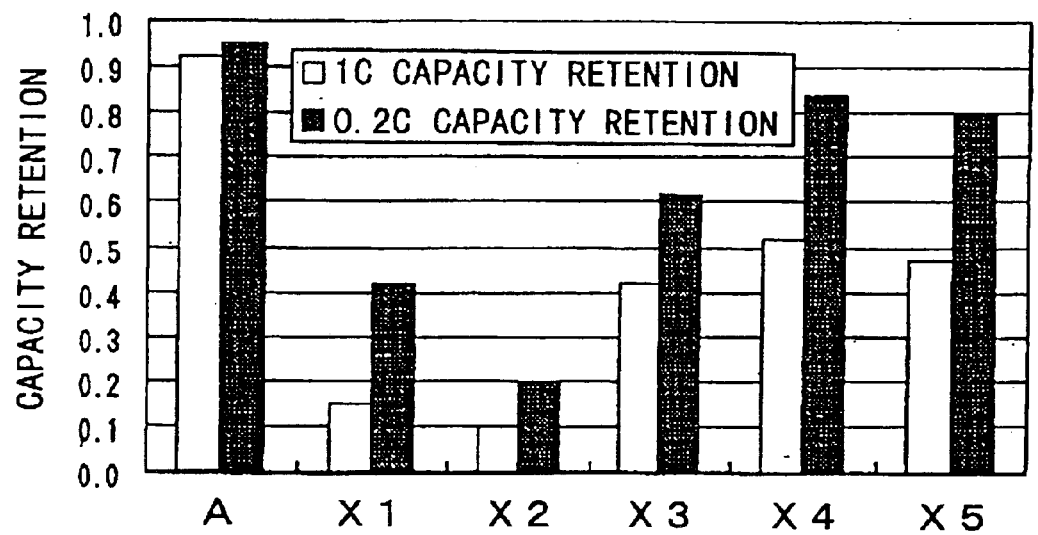
FIG. 1 shows graphs which compare the present battery A to comparative batteries in terms of capacity retention.

The present invention is below described in more detail by way of examples. It will be recognized that the following examples merely illustrate the practice of the present invention but are not intended to be limiting thereof. Suitable changes and modifications can be effected without departing from the scope of the present invention.

The following Experiments 1–3 are directed to show examples in accordance with the first aspect of the present invention.

EXPERIMENT 1

In this experiment 1, batteries were constructed using various types of positive electrode materials and their performance characteristics were compared.

Example

Fabrication of a positive electrode is first described. Lithium hydroxide (LiOH), manganese nitrate ($Mn(NO_3)_2$) and aluminum nitrate ($Al(NO_3)_3$) were blended in the ratio by mole of Li to Mn to Al of 1:1.95:0.05. The blend was heat treated in the atmosphere at 800° C. for 20 hours and then subjected to size reduction to obtain a lithium-manganese complex oxide (first oxide) having a mean particle diameter of 15 μm and represented by the compositional formula $LiMn_{1.95}Al_{0.05}O_4$. This first oxide had a spinel structure.

Also, LiOH, nickel nitrate ($Ni(NO_3)_2$), cobalt nitrate ($Co(NO_3)_2$) and manganese nitrate ($Mn(NO_3)_3$) were blended in the ratio by mole of Li to Ni to Co to Mn of 1:0.6:0.3:0.1. The blend was heat treated in oxygen atmosphere at 750° C. for 20 hours and then subjected to size reduction to obtain a lithium-nickel-cobalt complex oxide (second oxide) having a mean particle diameter of 10 μm and represented by the compositional formula $LiNi_{0.6}Co_{0.3}Mn_{0.1}O_2$.

The first and second oxides such obtained were mixed in the ratio by weight of 1:1 to prepare a positive electrode material (positive active material).

90 parts by weight of this powder-form positive active material, 5 parts by weight of artificial graphite powder and an N-methyl-2-pyrrolidone (NMP) solution containing 5 parts by weight of polyvinylidene fluoride were mixed to prepare a slurry. This slurry was applied to opposite sides of an aluminum foil by a doctor blade technique to form active material layers. Subsequent vacuum drying at 150° C. for 2 hours resulted in the fabrication of a positive electrode.

Then, 95 parts by weight of natural graphite and an NMP solution containing 5 parts by weight of polyvinylidene fluoride were mixed to prepare a carbon slurry. This carbon slurry was applied to opposite sides of a copper foil by a doctor blade technique to form carbon layers. Subsequent vacuum drying at 150° C. for 2 hours resulted in the fabrication of a negative electrode.

1 mole/liter of $LiPF6$ was dissolved in a mixed solvent containing ethylene carbonate and dimethyl carbonate in a ratio by volume of 1:1 to prepare a nonaqueous electrolyte solution.

The above positive electrode, negative electrode and nonaqueous electrolyte solution were used to construct a battery A of the present invention in the form of an AA-size nonaqueous electrolyte secondary battery (battery size: 14 mm in diameter, height of 50 mm, nominal capacity of 580 mAh). Used as a separator was a microporous membrane formed of polypropylene.

Comparative Example 1

In the positive electrode fabrication of the above Example, only the lithium-manganese complex oxide (first oxide) was used as positive active material. Otherwise, the procedure used to construct the battery A of the present invention was followed to construct a comparative battery X1.

Comparative Example 2

In the positive electrode fabrication of the above Example, only a lithium-manganese complex oxide (spinel manganese) represented by $LiMn_2O_4$ was used as positive active material. Otherwise, the procedure used to construct the battery A of the present invention was followed to construct a comparative battery X2.

Comparative Example 3

In the positive electrode fabrication of the above Example, only the lithium-nickel-cobalt complex oxide (second oxide) was used as positive active material. Otherwise, the procedure used to construct the battery A of the present invention was followed to construct a comparative battery X3.

Comparative Example 4

In the positive electrode fabrication of the above Example, the lithium-manganese complex oxide (spinel manganese) represented by the compositional formula $LiMn_2O_4$ was used for the first oxide. Otherwise, the procedure of Example 1 was followed to construct a comparative battery X4.

Comparative Example 5

In the positive electrode fabrication of the above Example, the lithium-nickel-cobalt complex oxide represented by the compositional formula $LiNi_{0.8}Co_{0.2}O_2$ was used for the second oxide. Otherwise, the procedure used to construct the battery A of the present invention was followed to construct a comparative battery X5.

The positive electrode materials used to construct the above batteries are specified in Table 1.

TABLE 1

| Type of Battery | Positive Electrode Material |
| --- | --- |
| Present Battery A | $LiMn_{1.95}Al_{0.05}O_4$ |
|  | $LiNi_{0.6}Co_{0.3}Mn_{0.1}O_2$ |
| Comparative Battery X1 | $LiMn_{1.95}Al_{0.05}O_4$ |
| Comparative Battery X2 | $LiMn_2O_4$ |
| Comparative Battery X3 | $LiNi_{0.6}Co_{0.3}Mn_{0.1}O_2$ |
| Comparative Battery X4 | $LiMn_2O_4$ |
|  | $LiNi_{0.6}Co_{0.3}Mn_{0.1}O_2$ |
| Comparative Battery X5 | $LiMn_{1.95}Al_{0.05}O_4$ |
|  | $LiNi_{0.8}Co_{0.2}O_2$ |

Charge-discharge Test

Each of the present battery A and comparative batteries X1–X5 was charged, at a constant current of 580 mA which is a value equivalent to the 1C rate, to 4.2 V at room temperature (25° C.), further charged, at a constant voltage of 4.2 V, to an end current of 50 mA, and then discharged, at a constant current of 580 mA which is a value equivalent to the 1C rate, to 2.75 V. The discharge capacity was recorded as a 1C capacity $A_1$.

Next, each battery was charged in the same fashion as described above and then discharged, at a constant current of 116 mA which is a value equivalent to the 0.2C rate, to 2.75 V. The discharge capacity was recorded as a 0.2C capacity $B_1$.

The charge-discharge cycle practiced above in measuring the 1C capacity, as a unit cycle, was repeated. After 200 charge-discharge cycles, measurement was carried out in the same manner as above to find a 1C capacity $A_{200}$ and a 0.2C capacity $B_{200}$. A 1C capacity retention $A_{200}/A_1$ and a 0.2C capacity retention $B_{200}/B_1$, after 200 cycles, were also found.

The results are shown in FIG. 1.

In these results, a larger difference between the 1C and 0.2C capacity retentions indicates a larger decrease of load characteristics after cycles.

As can be seen from comparison between the comparative batteries X1 and X2, the 1C and 0.2C capacity retentions can be both improved by incorporation of a dissimilar element (Al) in the first oxide, i.e., the lithium-manganese complex oxide ($LiMn_2O_4$), in the form of a solid solution. This is because the incorporation of the dissimilar element in the first oxide, in the form of a solid solution, reinforced a crystal structure to the extent that suppressed degradation of the crystal structure with cycling.

From comparison of the comparative batteries X3–X5 to X1 and X2, it has been found that the 1C and 0.2C capacity retentions can be both improved when $LiMn_2O_4$ is mixed with $LiNi_{0.6}Co_{0.3}Mn_{0.1}O_2$ or $LiNi_{0.8}Co_{0.2}O_2$ than when it is used alone in the positive electrode, or, when $LiMn_{1.95}Al_{0.05}O_4$ is mixed with $LiNi_{0.8}Co_{0.2}O_2$ than when it is used alone in the positive electrode. This is because the lithium-manganese complex oxide, when combined with the lithium-nickel-cobalt complex oxide, becomes more effective to suppress expansion and shrinkage of the whole of a positive electrode mix with cycling.

As can also be seen from comparison of the present battery A to comparative batteries X3–X5, the combination of $LiMn_{1.95}Al_{0.05}O_4$ with $LiNi_{0.6}Co_{0.3}Mn_{0.1}O_2$ results not only in the marked improvements of the 1C and 0.2C capacity retentions but also in the marked reduction of a difference between the 1C and 0.2C capacity retentions that suppresses load characteristic deterioration with cycling. This is considered due to the incorporation of a dissimilar element in each of the lithium-manganese complex oxide and lithium-nickel-cobalt complex oxide, in the form of a solid solution, that caused a change in electronic state of the active material, i.e., a combination of the first and second oxides, in such a way to increase electronic conductivity of its entirety, and also caused a change in its expansion-shrinkage behavior with charge-discharge cycling in such a way to maintain stable contact between particles of the first and second oxides during charge-discharge cycles.

In the above examples, the oxide represented by the compositional formula $LiMn_{1.95}Al_{0.05}O_4$ was used for the first oxide incorporating a dissimilar element in the form of a solid solution. It has been also proved that the same effect can be obtained with the use of a lithium-manganese complex oxide represented by the compositional formula $Li_xMn_{2-y}M1_yO_{4+z}$ (where, M1 is at least one element selected from the group consisting of Al, Co, Ni, Mg and Fe, $0 \leq x \leq 1.2$, $0 < y < 0.1$ and $-0.2 \leq z \leq 0.2$).

Also in the above examples, the oxide represented by the compositional formula $LiNi_{0.6}Co_{0.3}Mn_{0.1}O_2$ was used for the lithium-nickel-cobalt complex oxide (second oxide) that incorporated a dissimilar element in the form of a solid solution. It has been also proved that the same effect can be obtained with the use of a lithium-nickel-cobalt complex oxide represented by the compositional formula $Li_aM2_bNi_cCo_dO_2$ (where, M2 is at least one element selected from the group consisting of Al, Mn, Mg and Ti, $0 < a < 1.3$, $0.02 \leq b \leq 0.3$, $0.02 \leq d/(c+d) \leq 0.9$ and $b+c+d=1$).

EXPERIMENT 2

In this experiment 2, the amounts of the first and second oxides contained in the positive electrode and accordingly their relative contents were varied to compare performance characteristics of the resulting batteries.

The procedure utilized in the preceding example to construct the battery A in accordance with this invention was followed, with the exception that the mixing ratio by weight of the first to second oxide was varied to 10:90, 20:80, 80:20 and 90:10, to construct batteries B1–B4. These batteries were subsequently measured for 1C and 0.2C capacity retentions in the same manner as in Experiment 1. The results are shown in FIG. 2.

Figure 2:
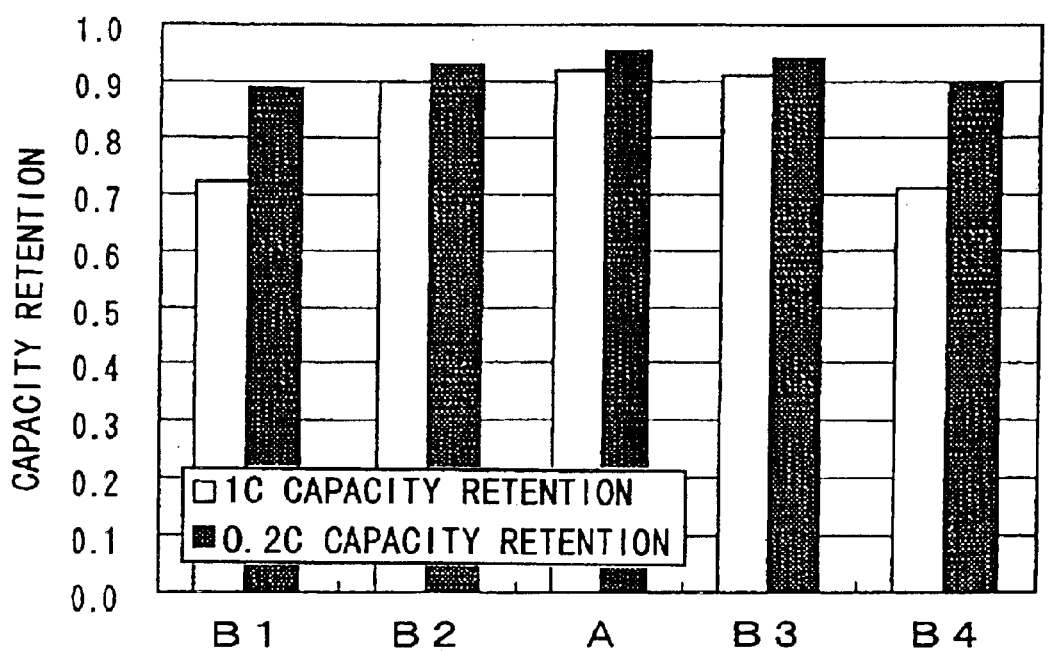
FIG. 2 shows graphs which compare the battery A to the batteries B1–B4 in terms of capacity retention.

In FIG. 2, the results for the battery A (a ratio by weight of the first to second oxide=50:50) used in the Experiment 1 are also shown.

The results shown in FIG. 2 demonstrate that when the lithium-manganese complex oxide, i.e., the first oxide is added in the amount of 20–80% by weight of the mixture, the 1C and 0.2C capacity retentions are both improved and the deterioration of load characteristics with cycling is suppressed. This is because the first oxide, when added within the above-specified range, became more effective to maintain stable contact between particles of the first oxide, and the second oxide in the form of lithium-nickel-cobalt complex oxide, during charge-discharge cycles.

EXPERIMENT 3

In this experiment 3, the respective mean particle diameters of the first and second oxides contained in the positive electrode were varied to compare performance characteristics of the resulting batteries.

During synthesis of the first and second oxides, size reduction was effected in such a controlled fashion as to obtain positive electrode materials having mean particle diameters specified in Table 2. Otherwise, the procedure utilized in the preceding example to construct the battery A of the present invention was followed to construct batteries C1–C8.

TABLE 2

| Battery | Particle Diameter of First Oxide | Particle Diameter of Second Oxide |
|---------|----------------------------------|-----------------------------------|
| C1      | 15 μm                            | 2 μm                              |
| C2      | 15 μm                            | 3 μm                              |
| A       | 15 μm                            | 10 μm                             |
| C3      | 15 μm                            | 15 μm                             |
| C4      | 15 μm                            | 20 μm                             |
| C5      | 3 μm                             | 10 μm                             |
| C6      | 5 μm                             | 10 μm                             |
| C7      | 30 μm                            | 10 μm                             |
| C8      | 35 μμ                            | 10 μm                             |

Figure 3:
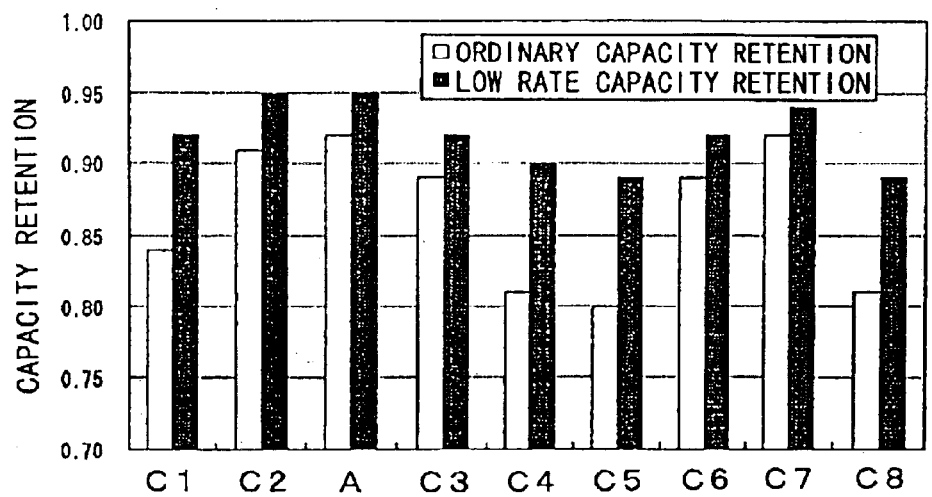
FIG. 3 shows graphs which compare the battery A to the batteries. C1–C8 in terms of capacity retention.

Then, the 1C and 0.2C capacity retentions were measured for the batteries C1–C8 in the same manner as in the above Experiment 1. The results are shown in FIG. 3. In this FIG. 3, the data obtained for the battery A of the present invention prepared in the preceding Experiment A are also shown.

As can be seen from the results shown in FIG. 3, when the first oxide in the form of a lithium-manganese complex oxide has a mean particle diameter in the range of 5–30 μm and the second oxide in the form of a lithium-nickel-cobalt complex oxide has a mean particle diameter in the range of 3–15 μm, the 1C and 0.2C capacity retentions, in particular, are improved and the deterioration of load characteristics with cycling can be suppressed.

Particularly when the mean particle diameter of each complex oxide is within the above-specified range, contact between particles of the complex oxide is maintained at a higher degree of occurrence to thereby improve electronic conductivity of the cathode mix in its entirety. Also, expansion and shrinkage of each complex oxide are balanced in an effective manner. These are considered to result in the improved characteristics of the batteries C2, A, C3, C6 and C7.

From comparison of the batteries C2, A and C7 to C3 and C6, it is found preferable that the first oxide has a larger mean particle diameter than the second oxide.

The following. Experiments 4–7 describe examples in accordance with a second aspect of the present invention.

EXPERIMENT 4

In this experiment 4, batteries were constructed using various types of positive electrode materials and their performance characteristics were compared.

Example

The first and second, oxides were prepared in the same manner as in the above Experiment 1.

Also, a third oxide was prepared in the following manner. LiOH, cobalt nitrate ($Co(NO_3)_2$) and magnesium nitrate ($Mg(No_3)_2 \cdot 6H_2O$) were blended in the ratio by mole of Li to Co to Mg of 1:0.9:0.1. The blend was heat treated in a dry air at 750° C. for 20 hours and then subjected to size reduction to obtain a lithium-cobalt complex oxide (third oxide) having a mean particle diameter of 10 μm and represented by the formula $LiCo_{0.9}Mg_{0.1}O_2$.

The first, second and third oxides such obtained were then mixed in the ratio by weight of 1:0.5:0.5 to prepare a positive electrode material (positive active material).

Using this positive active material, a positive electrode was fabricated in the same manner as in the above Experiment 1.

The procedure of the above Experiment 1 was followed to fabricate a negative electrode and prepare a nonaqueous electrolyte solution.

By using such-obtained positive electrode, negative electrode and nonaqueous electrolyte solution, a battery D in accordance with the present invention was constructed in the same manner as in the above Experiment 1.

Comparative Example 6

In the above Example, the lithium-manganese complex oxide (first oxide) and the lithium-cobalt complex oxide (third oxide) were mixed in the ratio by weight of 1:1 to provide a positive active material for use in the positive electrode. Otherwise, the procedure used to construct the battery D of the present invention was followed to construct a comparative battery Y1.

Comparative Example 7

In the above Example, the lithium-manganese-complex oxide (first oxide) was used alone to provide a positive active material for use in the positive electrode. Otherwise, the procedure used to construct the battery D of the present invention was followed to construct a comparative battery Y2.

Comparative Example 8

In the above Example, a lithium-manganese complex oxide (spinel manganese) represented by $LiMn_2O_4$ was used alone to provide a positive active material for use in the positive electrode. Otherwise, the procedure used to construct the battery D of the present invention was followed to construct a comparative battery Y3.

Comparative Example 9

In the above Example, the lithium-nickel-cobalt complex oxide (second oxide) was used alone to provide a positive active material for use in the positive electrode. Otherwise, the procedure used to construct the battery D of the present invention was followed to construct a comparative battery Y4.

Comparative Example 10

In the above Example, the lithium-cobalt complex oxide (third oxide) was used alone to provide a positive active material for use in the positive electrode. Otherwise, the procedure used to construct the battery D of the present invention was followed to construct a comparative battery Y5.

Comparative Example 11

In the above Example, the lithium-manganese complex oxide (spinel manganese) represented by $LiMn_2O_4$ was used for the first oxide, and this lithium-manganese complex oxide (first oxide) and the lithium-nickel-cobalt complex oxide (second oxide) were mixed in the ratio by weight of 1:1 to provide a positive active material for use in the positive electrode. Otherwise, the procedure used to construct the battery D of the present invention was followed to construct a comparative battery Y6.

Comparative Example 12

In the above Example, the lithium-nickel-cobalt complex oxide represented by $LiNi_{0.8}Co_{0.2}O_2$ was used for the second oxide, and the lithium-manganese complex oxide (first oxide) and this lithium-nickel-cobalt complex oxide (second oxide) were mixed in the ratio by weight of 1:1 to provide a positive active material for use in the positive electrode. Otherwise, the procedure used to construct the battery D of the present invention was followed to construct a comparative battery Y7.

Comparative Example 13

In the above Example, the lithium-manganese complex oxide (spinel manganese) represented by the compositional formula $LiMn_2O_4$ was used for the first oxide. Otherwise, the procedure used to construct the battery D of the present invention was followed to construct a comparative battery Y8.

Comparative Example 14

In the above Example, the lithium-nickel-cobalt complex oxide represented by compositional formula $LiNi_{0.8}Co_{0.2}O_2$ was used for the second oxide. Otherwise, the procedure used to construct the battery D of the present invention was followed to construct a comparative battery Y9.

The above comparative batteries Y2, Y3, Y4, Y6 and Y7 are identical to the comparative batteries X1, X2, X3, X4 and X5 constructed in Experiment 1, respectively.

The positive materials of the batteries constructed in the manner as described above are listed in Table 3. In Table 3, the battery A of the present invention in the above Experiment 1 is also shown.

TABLE 3

|  | Positive Electrode Material |
| --- | --- |
| Present Battery D | $LiMn_{1.95}Al_{0.05}O_4$ |
|  | $LiNi_{0.6}Co_{0.3}Mn_{0.1}O_2$ |
|  | $LiCo_{0.9}Mg_{0.1}O_2$ |
| Present Battery A | $LiMn_{1.95}Al_{0.05}O_4$ |
|  | $LiNi_{0.6}Co_{0.3}Mn_{0.1}O_2$ |
| Comparative Battery Y1 | $LiMn_{1.95}Al_{0.05}O_4$ |
|  | $LiCo_{0.9}Mg_{0.1}O_2$ |
| Comparative Battery Y2 | $LiMn_{1.95}Al_{0.05}O_4$ |
| Comparative Battery Y3 | $LiMn_2O_4$ |
| Comparative Battery Y4 | $LiNi_{0.6}Co_{0.3}Mn_{0.1}O_2$ |
| Comparative Battery Y5 | $LiCo_{0.9}Mg_{0.1}O_2$ |
| Comparative Battery Y6 | $LiMn_2O_4$ |
|  | $LiNi_{0.6}Co_{0.3}Mn_{0.1}O_2$ |
| Comparative Battery Y7 | $LiMn_{1.95}Al_{0.05}O_4$ |
|  | $LiNi_{0.8}Co_{0.2}O_2$ |
| Comparative Battery Y8 | $LiMn_2O_4$ |
|  | $LiNi_{0.6}Co_{0.3}Mn_{0.1}O_2$ |
|  | $LiCo_{0.9}Mg_{0.1}O_2$ |
| Comparative Battery Y9 | $LiMn_{1.95}Al_{0.05}O_4$ |
|  | $LiNi_{0.8}Co_{0.2}O_2$ |
|  | $LiCo_{0.9}Mg_{0.1}O_2$ |

Charge-discharge Test

Each of the batteries D and A and comparative batteries Y1–Y9 constructed in the manner as described above was subjected to a charge-discharge test similar to the above Experiment 1 to determine its 1C capacity retention and 0.2C capacity retention.

Figure 4:
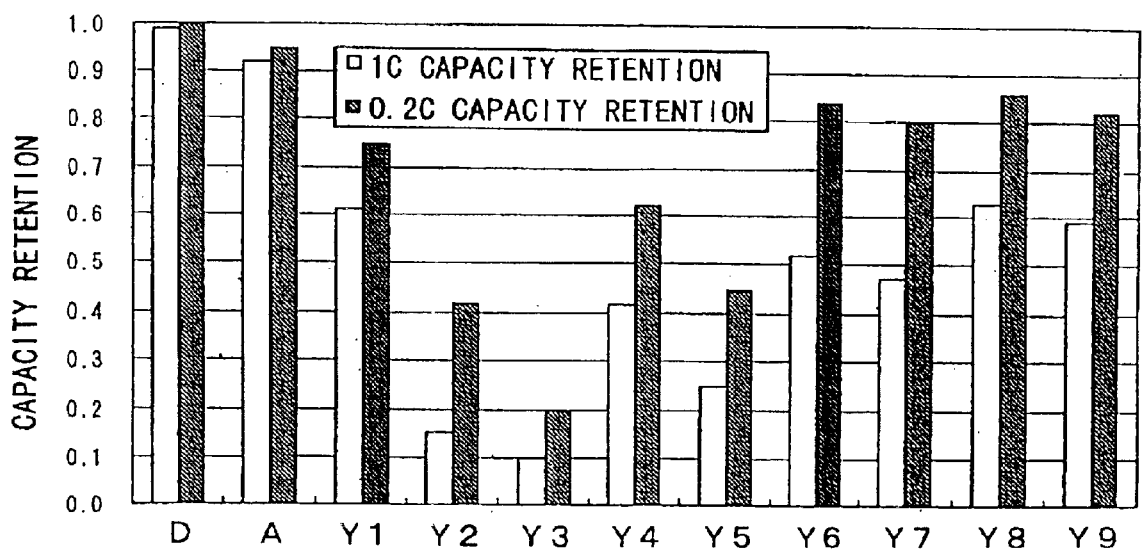
FIG. 4 shows graphs which compare the present batteries A and D to comparative batteries in terms of capacity retention.

The results are given in FIG. 4.

As can be seen from comparison between the comparative batteries Y2 and Y3, the 1C and 0.2C capacity retentions can be both improved by incorporation of a dissimilar element (Al) in the first oxide, i.e., the lithium-manganese complex oxide ($LiMn_2O_4$), in the form of a solid solution. This is because the incorporation of the dissimilar element in the first oxide, in the form of a solid solution, reinforced a crystal structure to the extent that suppressed degradation of the crystal structure with charge-discharge cycling.

From comparison of the comparative batteries Y2–Y4 to Y6 and Y7, it has been found that the 1C and 0.2C capacity retentions can be both improved when $LiMn_2O_4$ is mixed with $LiNi_{0.6}Co_{0.3}Mn_{0.1}O_2$ than when it is used alone in the positive electrode, or, when $LiMn_{1.95}Al_{0.05}O_4$ is mixed with $LiNi_{0.8}Co_{0.2}O_2$ than when it is used alone in the positive electrode. This is because the lithium-manganese complex oxide, when combined with the lithium-nickel-cobalt complex oxide, becomes more effective to suppress expansion and shrinkage of a positive electrode mix in its entirety with charge-discharge cycling.

As can also be seen from comparison of the battery A in accordance with the present invention to the comparative batteries Y6 and Y7, the combination of $LiMn_{1.95}Al_{0.05}O_4$ with $LiNi_{0.6}Co_{0.3}Mn_{0.1}O_2$ results not only in marked improvements of the 1C and 0.2C capacity retentions but also in the marked reduction of a difference between the 1C and 0.2C capacity retentions that suppresses load characteristic deterioration with cycling. This is considered due to the incorporation of a dissimilar element in each of the lithium-manganese complex oxide and lithium-nickel-cobalt complex oxide, in the form of a solid solution, that caused a change in electronic state of the active material comprising the first and and second oxides, in such a way to increase electronic conductivity of its entirety, and also caused a change in its expansion-shrinkage behavior with charge-discharge cycling in such a way to maintain stable contact between particles of the first and second oxides during charge-discharge cycles.

Also from comparison of the comparative batteries Y1 to Y2 and Y5, it has been found that the 1C and 0.2C capacity retentions can be both improved when the first oxide in the form of $LiMn_{1.95}Al_{0.05}O_4$ is combined with the third oxide in the form of mixed with $LiCo_{0.9}Mg_{0.1}O_2$ than when they are used alone in the positive electrode. This is because the third oxide is more electronically conductive than the first oxide and an electronic state of the active material in its entirety is caused to change when combined to further improve the electronic conductivity.

As can also be seen from comparison of the comparative batteries Y6 and Y7 to Y8 and Y9, further incorporation of $LiCo_{0.9}Mg_{0.1}O_2$ in the mixture of $LiMn_2O_4$ and $LiNi_{0.6}Co_{0.3}Mn_{0.1}O_2$ or the mixture of $LiMn_{1.95}Al_{0.05}O_4$ and $LiNi_{0.8}Co_{0.2}O_2$ results not only in marked improvements of the 1C and 0.2C capacity retentions but also in the marked reduction of a difference between the 1C and 0.2C capacity retentions that suppresses deterioration of load characteristics with cycling. These are considered to result for the same reason stated earlier.

As can also be seen from comparison of the battery D in accordance with the present invention to the comparative batteries Y8 and Y9, the combination of $LiMn_{1.95}Al_{0.05}O_4$, $LiNi_{0.6}Co_{0.3}Mn_{0.1}O_2$ and $LiCo_{0.9}Mg_{0.1}O_2$ in the positive electrode results not only in improvements of the 1C and 0.2C capacity retentions but also in the marked reduction of a difference between the 1C and 0.2C capacity retentions that suppresses deterioration of load characteristic with cycling. This is considered due to the addition of the third oxide having high electronic conductivity to the active material comprising the first and second oxides with improved electronic conductivities that caused a further change in electonic state of the active material in its entirety.

In the above examples, the oxide represented by the compositional formula $LiMn_{1.95}Al_{0.05}O_4$ was used for the first oxide incorporating a dissimilar element in the form of a solid solution. It has been also proved that the same effect can be obtained with the use of a lithium-manganese complex oxide represented by the compositional formula $Li_xMn_{2-y}M1_yO_{4+z}$ (where, M1 is at least one element selected from the group consisting of Al, Co, Ni, Mg and Fe, $0 \leq x \leq 1.2$, $0 < y \leq 0.1$ and $-0.2 \leq z \leq 0.2$).

Also in the above examples, the oxide represented by the compositional formula $LiNi_{0.6}Co_{0.3}Mn_{0.1}O_2$ was used for the lithium-nickel-cobalt complex oxide (second oxide) that incorporated a dissimilar element in the form of a solid solution. It has been also proved that the same effect can be obtained with the use of a lithium-nickel-cobalt complex oxide represented by the compositional formula $Li_aM2_bNi_cCo_dO_2$ (where, M2 is at least one element selected from the group consisting of Al, Mn, Mg and Ti, $0 < a < 1.3$, $0.02 \leq b \leq 0.3$, $0.02 \leq d/(c+d) \leq 0.9$ and $b+c+d=1$).

Also in the above examples, the oxide represented by the compositional formula $LiCo_{0.9}Mg_{0.1}O_2$ was used for the lithium-cobalt complex oxide (third oxide). It has been also proved that the same effect can be obtained with the use of a lithium-cobalt complex oxide represented by the compositional formula $Li_eM3_fCo_{1-f}O_2$ (where, M3 is at least one element selected from the group consisting of Al, Mn, Mg and Ti, $0 < e < 1.3$ and $0 \leq f \leq 0.4$).

EXPERIMENT 5

In this experiment 5, the first oxide content of the positive electrode material was varied to compare performance characteristics of resulting batteries.

A blending ratio by weight of the first to second to third oxide was varied to 10:45:45, 20:40:40, 80:10:10 and 90:5:5. Otherwise, the procedure used in the above example to construct the battery D in accordance with the present invention was followed to construct batteries E1–E4. These batteries were measured for 1C and 0.2C capacity retentions in the same manner as in the above Experiment 1. The results are shown in FIG. 5.

Figure 5:
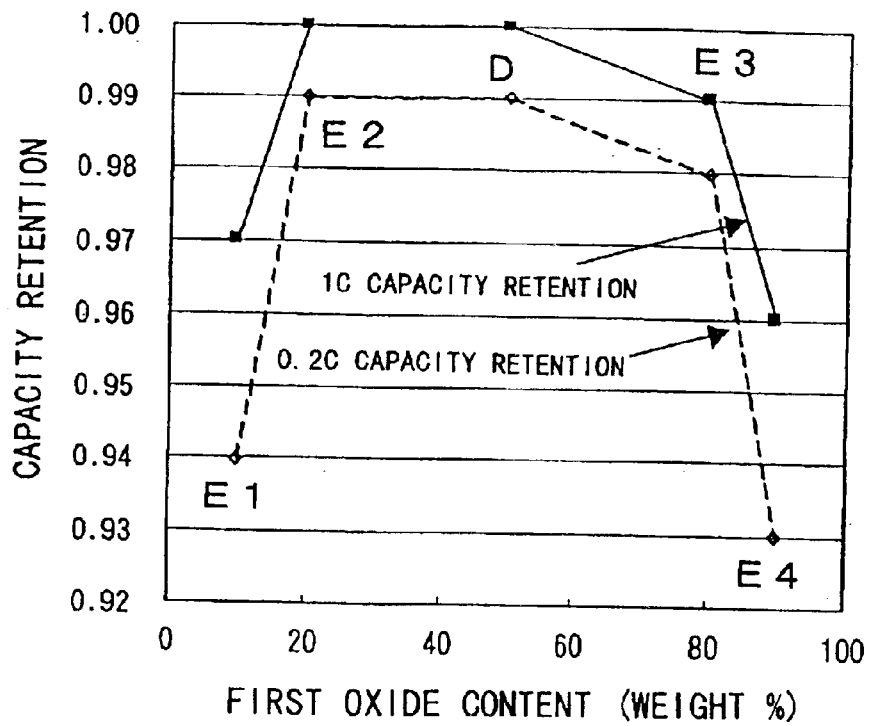
FIG. 5 shows graphs which compare the battery D to the batteries E1–E4 in terms of capacity retention.

In FIG. 5, the results obtained for the battery D (weight ratio of the first to second to third oxide=50:25:25) used in the above Experiment 4 are also shown.

As can be seen from the results shown in FIG. 5, when the lithium-manganese complex oxide, i.e., the first oxide, is incorporated in the mixture in the amount of 20–80% by weight, the 1C and 0.2C capacity retentions are improved and the deterioration of load characteristics with cycling can be suppressed. This is probably because the first oxide, when added within the above-specified range, became more effective to maintain stable contact between particles of the first oxide and the second oxide in the form of lithium-nickel-cobalt complex oxide during charge-discharge cycles.

EXPERIMENT 6

In this experiment 6, a ratio by content of the second to third oxide in the positive electrode material was varied to compare performance characteristics of resulting batteries.

A blending ratio by weight of the first to second to third oxide was varied to 50:3:47, 50:5:45, 50:45:5 and 50:47:3. Otherwise, the procedure used in the above example to construct the battery D in accordance with the present invention was followed to construct batteries F1–F4. These batteries were measured for 1C and 0.2C capacity retentions in the same manner as in the above Experiment 1. The results are shown in FIG. 6.

Figure 6:
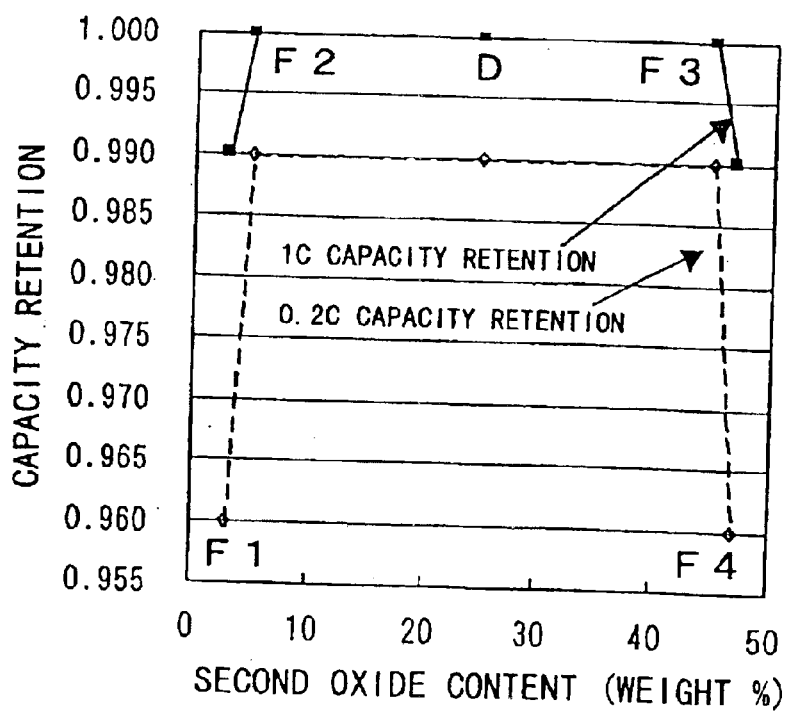
FIG. 6 shows graphs which compare the battery D to the batteries F1–F4 in terms of capacity retention.

In FIG. 6, the results obtained for the battery D (weight ratio of the first to second to third oxide=50:25:25) used in the above Experiment 4 are also shown.

As can be seen from the results shown in FIG. 6, when the lithium-nickel-cobalt complex oxide, i.e., the second oxide, and the lithium-cobalt complex oxide, i.e., the third oxide, are mixed in the ratio by weight of 90:10–10:90, the 1C and 0.2C capacity retentions are improved and the deterioration of load characteristics with cycling can be suppressed. This is considered due to the addition of the third oxide having high electronic conductivity to the active material comprising the first and second oxides with improved electronic conductivities that caused a further change in electronic state of the active material in its entirety.

EXPERIMENT 7

In this experiment 7, a mean particle diameter of the third oxide in the positive electrode material was varied to compare performance characteristics of resulting batteries.

During synthesis of the third oxide, size reduction was effected in such a controlled fashion as to obtain positive electrode materials having mean particle diameters specified in Table 2. Otherwise, the procedure used in the example to construct the battery D in accordance with the present invention was followed to construct batteries G1–G4.

TABLE 4

| Battery | Particle Diameter of First Oxide | Particle Diameter of Second Oxide | Particle Diameter of Third Oxide |
|---|---|---|---|
| G1 | 15 μm | 10 μm | 2 μm |
| G2 | 15 μm | 10 μm | 3 μm |
| D | 15 μm | 10 μm | 10 μm |
| G3 | 15 μm | 10 μm | 15 μm |
| G4 | 15 μm | 10 μm | 20 μm |

Figure 7:
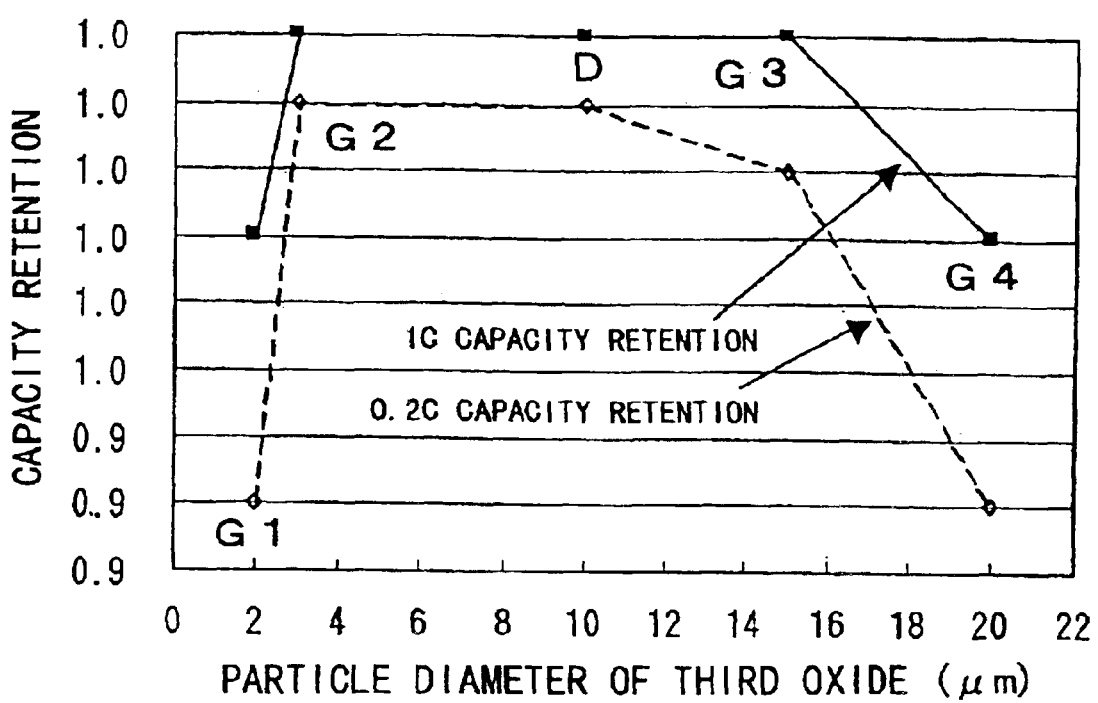
FIG. 7 shows graphs which compare the battery D to the batteries G1–G4 in terms of capacity retention.

Then, the 1C and 0.2C capacity retentions were measured for the batteries G1–G4 in the same manner as in the above Experiment 1. The results are shown in FIG. 7. In this FIG. 7, the data obtained for the battery D of the present invention constructed in the preceding Experiment 4 are also shown.

As can be seen from the results shown in FIG. 7, when the third oxide, in the form of lithium-cobalt complex oxide, has a mean particle diameter in the range of 3–15 μm, the 1C and 0.2C capacity retentions, in particular, are improved and the deterioration of load characteristics with cycling can be suppressed.

Particularly when the mean particle diameter of the third complex oxide falls within the above-specified range, contact between particles of all the complex oxides is maintained at a higher degree of occurrence to thereby improve electronic conductivity of the cathode mix in its entirety as a result of a change in its electronic state. Also, expansion and shrinkage of each complex oxide are balanced in an effective manner. These are considered to result in the improved characteristics of the batteries G2, D and G3.

UTILITY IN INDUSTRY

As described above in detail, the present invention can provide a secondary lithium battery which shows the reduced deterioration of load charactertistic with cycling.

What is claimed is:

1. A nonaqueous electrolyte secondary battery comprising a mixture of a first oxide and a second oxide for it's a positive electrode material of said battery,
   wherein said first oxide is a spinel lithium-manganese complex oxide that consists substantially of lithium, manganese, a metal other than manganese, and oxygen and that is represented by the compositional formula $Li_xMn_{2-y}M1_yO_{4+z}$ where M1 is at least one of Al and Mg, $0 \leq x \leq 1.2$, $0 < y \leq 0.1$ and $-0.2 \leq z \leq 0.2$, and
   wherein said second oxide is represented by the compositional formula $Li_aM2_bNi_cCo_dO_2$ where M2 is at least one element selected from the group consisting of Al, Mn, Mg and Ti, $0 < a < 1.3$, $0.02 \leq b \leq 0.3$, $0.02 \leq d/(c+d) \leq 0.9$ and $b+c+d=1$.

2. The nonaqueous electrolyte secondary battery as recited in claim 1, characterized in that said first oxide is an oxide derived via substitution of an other element for a part of manganese in said spinel lithium-manganese complex oxide.

3. The nonaqueous electrolyte secondary battery as recited in claim 1, characterized in that M2 in the second oxide's compositional formula $Li_aM2_bNi_cCo_dO_2$ is Mn.

4. The nonaqueous electrolyte secondary battery as recited in claim 3, characterized in that $0.1 \leq d/(c+d) \leq 0.5$ is satisfied in the second oxide's compositional formula $Li_aM2_bNi_cCo_dO_2$.

5. The nonaqueous electrolyte secondary battery as recited in claim 1, characterized in that said first and second oxides are mixed in the ratio by weight of 20:80–80:20.

6. The nonaqueous electrolyte secondary battery as recited in claim 1, characterized in that said first oxide has a mean particle diameter of 5–30 $\mu$m.

7. The nonaqueous electrolyte secondary battery as recited in claim 1, characterized in that said second oxide has a mean particle diameter of 3–15 $\mu$m.

8. A nonaqueous electrolyte secondary battery comprising a mixture of a first oxide, a second oxide and a third oxide for it's a positive electrode material of said battery,
   wherein said first oxide is a spinel oxide consisting substantially of lithium, manganese, a metal other than manganese, and oxygen,
   wherein said second oxide is different from said first oxide and consists substantially of lithium, nickel, cobalt, a metal other than nickel and cobalt, and oxygen,
   wherein said third oxide is different from said first and second oxides and consists substantially of lithium, cobalt and oxygen or of lithium, cobalt, a metal other than cobalt, and oxygen, and
   wherein said third oxide has a mean particle diameter of 3–15 $\mu$m.

9. The nonaqueous electrolyte secondary battery as recited in claim 8, characterized in that said first oxide is an oxide derived via substitution of an other element for a part of manganese in a lithium-manganese complex oxide, said second oxide is an oxide derived via substitution of cobalt and an other element for a part of nickel in a lithium-nickel complex oxide, and said third oxide is a lithium-cobalt complex oxide or an oxide derived via substitution of an other element for a part of cobalt in said lithium-cobalt complex oxide.

10. The nonaqueous electrolyte secondary battery as recited in claim 8, characterized in that said first oxide is a lithium-manganese complex oxide represented by the compositional formula $Li_xMn_{2-y}M1_yO_{4+z}$ (where M1 is at least one element selected from the group consisting of Al, Co, Ni, Mg and Fe, $0 \leq x \leq 1.2$, $0 < y \leq 0.1$ and $-0.2 \leq z \leq 0.2$).

11. The nonaqueous electrolyte secondary battery as recited in claim 10, characterized in that M1 in the first oxide's compositional formula $Li_xMn_{2-y}M1_yO_{4+z}$ is at least one of Al and Mg.

12. The nonaqueous electrolyte secondary battery as recited in claim 8, characterized in that said second oxide is represented by the compositional formula $Li_aM2_bNi_cCo_dO_2$ (where M2 is at least one element selected from the group consisting of Al, Mn, Mg and Ti, $0 < a < 1.3$, $0.02 \leq b \leq 0.3$, $0.02 \leq d/(c+d) \leq 0.9$ and $b+c+d=1$).

13. The nonaqueous electrolyte secondary battery as recited in claim 12, characterized in that M2 in the second oxide's compositional formula $Li_aM2_bNi_cCo_dO_2$ is Mn.

14. The nonaqueous electrolyte secondary battery as recited in claim 13, characterized in that $0.1 \leq d/(c+d) \leq 0.5$ is satisfied in the second oxide's compositional formula $Li_aM2_bNi_cCo_dO_2$.

15. The nonaqueous electrolyte secondary battery as recited in claim 8, characterized in that said third oxide is represented by the compositional formula $Li_eM3_fCo_{1-f}O_2$ (where M3 is at least one element selected from the group consisting of Al, Mn, Mg and Ti, $0 < e < 1.3$ and $0 \leq f \leq 0.4$).

16. The nonaqueous electrolyte secondary battery as recited in claim 15, characterized in that M3 in said third oxide's compositional formula $Li_eM3_fCo_{1-f}O_2$ is at least one element selected from the group consisting of Mg and Ti, and $0.02 \leq f \leq 0.2$.

17. The nonaqueous electrolyte secondary battery as recited in claim 8, characterized in that said first, second and third oxides are mixed in the ratio by weight of (first oxide) to (second oxide+third oxide)=20:80–80:20.

18. The nonaqueous electrolyte secondary battery as recited in claim 17, characterized in that said second and third oxides are mixed in the ratio by weight of (second oxide) to (third oxide)=90:10–10:90.

19. The nonaqueous electrolyte secondary battery as recited in claim 8, characterized in that said first oxide has a mean particle diameter of 5–30 $\mu$m.

20. The nonaqueous electrolyte secondary battery as recited in claim 8, characterized in that said second oxide has a mean particle diameter of 3–15 $\mu$m.

21. A nonaqueous electrolyte secondary battery comprising a mixture of a first oxide, a second oxide and a third oxide for a positive electrode material of said battery,
   wherein said first oxide is a spinel oxide consisting substantially of lithium, manganese, a metal other than manganese, and oxygen,
   wherein said second oxide is different from said first oxide and consists substantially of lithium, nickel, cobalt, a metal other than nickel and cobalt, and oxygen,
   wherein said third oxide is different from said first and second oxides and consists substantially of lithium, cobalt, a metal other than cobalt, and oxygen, and
   wherein said third oxide is represented by the compositional formula $Li_eM3_fCo_{1-f}O_2$ where M3 is at least one element selected from the group consisting of Mg and Ti, $0 < e < 1.3$ and $0.02 \leq f \leq 0.2$.

22. A nonaqueous electrolyte secondary battery comprising a mixture of a first oxide, a second oxide and a third oxide for a positive electrode material of said battery,
   wherein said first oxide is a spinel oxide consisting substantially of lithium, manganese, a metal other than manganese, and oxygen,
   wherein said second oxide is different from said first oxide and consists substantially of lithium, nickel, cobalt, a metal other than nickel and cobalt, and oxygen,
   wherein said third oxide is different from said first and second oxides and consists substantially of lithium, cobalt and oxygen or of lithium, cobalt, a metal other than cobalt, and oxygen, and
   wherein said second oxide has a mean particle diameter of 3–15 $\mu$m.

* * * * *

UNITED STATES PATENT AND TRADEMARK OFFICE
CERTIFICATE OF CORRECTION

PATENT NO.     : 6,746,800 B1
DATED          : June 8, 2004
INVENTOR(S)    : Sunagawa et al.

It is certified that error appears in the above-identified patent and that said Letters Patent is hereby corrected as shown below:

Column 2,
Line 46, after "in", replace "theform" by -- the form --.

Column 3,
Lines 47 and 50, before "in", replace "diffent" by -- different --.

Column 5,
Line 7, after "(DEE),", replace "1,2-dimethoxy ethane" by -- 1,2-dimethoxyethane --.

Column 13,
Line 6, before "state", replace "electonic" by -- electronic --.

Signed and Sealed this

Fourteenth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,746,800 B1
DATED : June 8, 2004
INVENTOR(S) : Sunagawa et al.

It is certified that error appears in the above-identified patent and that said Letters Patent is hereby corrected as shown below:

Column 2,
Line 46, after "in", replace "theform" by -- the form --.

Column 3,
Lines 47 and 50, before "in", replace "diffent" by -- different --.

Column 5,
Line 7, after "(DEE),", replace "1,2-dimethoxy ethane" by -- 1,2-dimethoxyethane --.

Column 13,
Line 6, before "state", replace "electonic" by -- electronic --.

Signed and Sealed this

Twenty-first Day of December, 2004

JON W. DUDAS
*Director of the United States Patent and Trademark Office*